United States Patent Office 3,629,245
Patented Dec. 21, 1971

3,629,245
16,17-ISOXAZOLINO-Δ-1,3,5(10)-GONATRIENES
Daniel Bertin, Montrouge, and Lucien Nedelec, Clichy-sous-Bois, France, assignor to Roussel-UCLAF, Paris, France
No Drawing. Continuation-in-part of application Ser. No. 556,796, May 9, 1966. This application July 7, 1969, Ser. No. 839,660
Claims priority, application Japan, May 14, 1965, 40/17,103; Aug. 11, 1965, 40/28,020
Int. Cl. C07c 173/10
U.S. Cl. 260—239.55     7 Claims

ABSTRACT OF THE DISCLOSURE

16α,17α-isoxazoline steroids of the formula

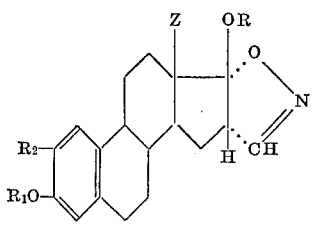

wherein R and $R_1$ are selected from the group consisting of hydrogen, alkyl of 1 to 7 carbon atoms and acyl of an organic carboxylic acids of 1 to 18 carbon atoms, $R_2$ is selected from the group consisting of hydrogen and halogen and Z is alkyl of 1 to 4 carbon atoms and their preparation and novel intermediates. The invention also includes hypocholesterolemic compositions having no substantial estrogenic activity.

PRIOR APPLICATION

The preesnt application is a continuation-in-part application of our copending, commonly assigned U.S. patent application Ser. No. 556,796 filed May 9, 1966, now abandoned.

PRIOR ART

U.S. Pat. No. 3,213,084 describes the preparation of various 3,16,17-trisubstituted-Δ1,3,5(10)-estratrienes including in Example I 17α-hydroxy-3-methoxy-Δ1,3,5(10)-estratriene-[16β,17β,-d]-Δ2'-isoxazoline which compounds are described as having estrogenic activity. Moreover, the patentees of the said patent described in the Journal of Organic Chemistry, Vol. 30 (1965), pages 2234–2238 the physiological activity of the said compound of Example I of their patent. They stated that the said compound was "a particularly potent estrogenic agent having a uterotropic effect in rats at the 3γ oral dose level, about six times that of estrone."

OBJECTS OF THE INVENTION

It is an object of the invention to provide the novel 16α,17α-isoxazoline steroids, of Formula I.
It is another object of the invention to provide a novel process for the preparation of the 16α,17α-isoxazolino steroids of Formula I.
It is a further object of the invention to provide novel intermediates for 16α,17α-isoxazolino steroids of Formula I.
It is an additional object of the invention to provide novel hypocholesterolemic compositions without estrogenic activity.
It is another object of the invention to provide a novel method for the treatment of hypercholesterolemia in animals.

These and other objects and advantages of the invention will become obvious from the following detailed description.

THE INVENTION

The novel compounds of the invention are 16α,17α-isoxazoline steroids of the formula

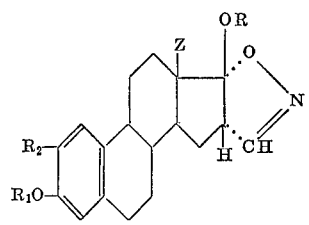

wherein R and $R_1$ are selected from the group consisting of hydrogen, alkyl of 1 to 7 carbon atoms and acyl of an organic carboxylic acids of 1 to 18 carbon atoms, $R_2$ is selected from the group consisting of hydrogen and halogen and Z is alkyl of 1 to 4 carbon atoms. $R_2$ may be a halogen such as fluorine, chlorine, bromine and iodine.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid, linoleic acid, ricinoleic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as p-phenyl benzoic acid, p-cyclohexyl benzoic acid, benzoic acid and 2,4-dinitrobenzoic acid; phenoxy alkanoic acids such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionylacetic acid and butyrylacetic acid; amino acids such as diethylaminoacetic acid and aspartic acid.

The novel process of the invention for the preparation of the 16α,17α-isoxazolino steroids of Formula I comprises reacting in an acidic media a 16-hydroxymethylene-13β-Z-Δ-1,3,5,(10)-gonatriene-17-one of the formula

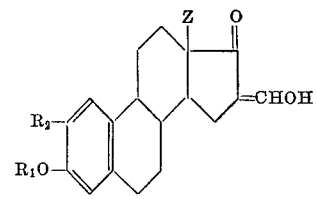

II wherein $R_1$, $R_2$ and Z have the above definitions with a compound selected from the group consisting of hydroxylamine and its acid addition salts to form a Δ2'-(4',5'-16α,17α)-isoxazolino-13β-Z-Δ1,3,5(10)-gonatriene-17β-ol of the formula

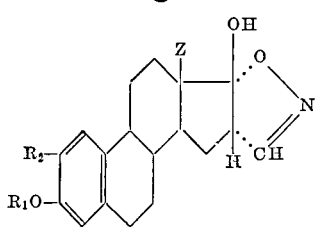

III wherein $R_1$, $R_2$ and Z have the above definitions and the 17-hydroxy group is etherified by reaction with an alkyl halide having 1 to 7 carbon atoms or esterified with an esterifying derivative of an organic carboxylic acid of 1 to 18 carbon atoms such as the acid halide or the acid anhydride to form a compound of the Formula I.

The isoxazolino derivative is obtained by the general method for oxazoles by condensation of hydroxylamine or an acid addition salt thereof such as its hydrochloride with a β-diketonic grouping, preferably in the preesnce of an organic solvent as a lower alkanol, i.e., methanol, ethanol, etc.

The 16-hydroxymethylene-13-Z-$\Delta^{1,3,5,(10)}$-gonatriene-17-ones of Formula II, which are the starting materials, can be prepared by reacting the corresponding 13-Z-$\Delta^{1,3,5(10)}$-gonatriene-17-one with a lower alkyl formate such as ethyl formate or methyl formate in the presence of a base such as an alkali metal alcoholate, an alkali metal hydride or an alkali metal in an organic solvent. The organic solvent may be one or more alkanols such as methanol, ethanol, etc.; aromatic hydrocarbons such as benzene, toluene, etc.; dialkyl substituted amides of carboxylic acids such as dimethyl formamide; heterocyclic bases such as pyridine; or ethers such as ethyl ether, dioxane, tetrahydrofuran, etc.

There are four different possible isomeric forms of 16,17-isoxaline steroids of the general formula

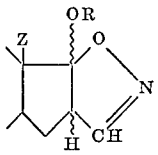

U.S. Pat. 3,213,084 describes producing 16,17-isoxazoline steroids having a 17α-hydroxy-16β,17β-isoxaline configuration which compounds are produced in a basic medium in contrast to the acidic medium of the process of the present invention. The type of compound produced in the said patent can be described as α,α while the compound of the present application can be described as β,β. Comparison of the UV spectra also show this distinction and the structural difference is further emphasized by the different physiological activities; estrogenic for the compound of Pat. 3,213,084 and no substantial estrogenic activity for the compound of the present application.

The novel hypocholesterolemic compositions of the invention having no substantial estrogenic activity are comprised of at least one 16α,17α-isoxazolino steroid of the formula

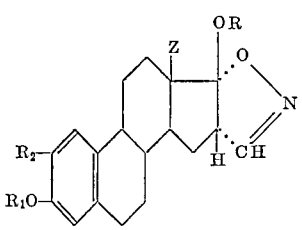

I wherein R, $R_1$, $R_2$ and Z have the above definitions and a major amount of a pharmaceutical carrier. The said compositions may be in the form of injectable solutions or suspensions, in ampules, in multiple dose flacons, in the form of tablets, coated tablets, sublingual tablets, capsules and suppositories prepared in the usual manner.

The novel method of the invention for treating hypercholesterolemia in mammals comprises administering to the mammals an effective amount of at least one 16α,17α-isoxazolino steroid of the formula

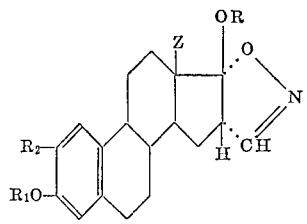

I wherein R, and $R_1$, $R_2$ and Z have the above definitions. The said compounds can be administered orally, perlingually, transcutaneously or rectally. The usual daily dose is between 20γ and 400γ/kg. for adults depending upon the method of administration. Since the compounds are useful for the treatment of hypercholester olemia, they are useful for preventing and curing arterial disorders, cerebral artheritis, aoritis, coronaritis, chest angina and atheromatosis.

In the following examples there are described several preferred embodiments to illustrate the invention. However, it should be understood that the invention is not intended to be limited to the specific embodiments.

EXAMPLE I

Preparation of $\Delta^{2'}$-(4',5'-16α,17α)-isoxazolino-2-fluoro-$\Delta^{1,3,5(10)}$-estratriene-3,17β-diol Step A: Preparation of 2-fluoro-16-hydroxymethylene-$\Delta^{1,3,5(10)}$-estratriene-3,-ol-17-one.—0.6 gm. of 2-fluoroestrone (described by Hecher et al., Biochem Z., vol. 338, 1963, page 628) were suspended in 140 cc. of benzene and 18 cc. of ethyl formate and 0.8 gm. of sodium hydride were added thereto after which 0.8 cc. of methanol were slowly added. The mixture was heated and refluxed for 90 minutes, cooled and diluted with water. The aqueous alkaline phase was decanted, washed with a benzene-ether mixture, degasified under an atmosphere of nitrogen and slowly acidified with hydrochloric acid. The precipitate formed was vacuum filtered and dried to obtain 1.57 gm. of 2-fluoro-16-hydroxymethylene-$\Delta^{1,3,5(10)}$-estratriene-3-ol-17-one having a melting point of 250° C. The solid, colorless product was soluble in dilute aqueous alkalis, in alcohol, benzene and chloroform and insoluble in water and dilute aqueous acids.

Step B: Preparation of $\Delta^{2'}$-(4',5'-16α,17α)-isoxazolino-2-fluoro-$\Delta^{1,3,5(10)}$-estratriene-3,17β-diol.—1.57 gm. of 2-fluoro-16-hydroxymethylene-$\Delta^{1,3,5(15)}$-estratriene-3-ol - 17-one, 35 cc. of ethanol and 0.49 gm. of hydroxylamine hydrochloride were admixed. The mixture was refluxed for 1 hour, neutralized with triethylamine and then cooled. The precipitate formed was vacuum filtered, washed with alcohol and dried to obtain 1 gm. of $\Delta^{2'}$(4',5'-16α,17α)-isoxazolino-2-fluoro-$\Delta^{1,3,5(10)}$-estratriene-3,17β-diol having a melting point of 278–280° C. and a specific rotation of $[\alpha]_D^{20} = +110°$ (c.=0.6% in dimethylformamide).

The product was colorless, solid, soluble in dimethylformamide and insoluble in water, alcohol, acetone, benzene and chloroform.

Analysis.—$C_{19}H_{22}O_3NF$ (molecular weight=331.36): Calculated (percent): C, 68.86; H, 6.69; N, 4.23. Found (percent): C, 69.2; H, 7.0; N, 4.4.

This product is not described in the literature.

EXAMPLE II

Preparation of $\Delta^{2'}$-(4',5'-16α,17α)-isoxazolino-3,17β-dimethoxy-$\Delta^{1,3,5(10)}$-estratriene Step A: Preparation of $\Delta^{2'}$-(4',5'-16α,17α)-isoxazolino-3-methoxy-$\Delta^{1,3,5(10)}$-estratriene-17β-ol.—5 gm. of 3 methoxy-16-hydroxymethylene-$\Delta^{1,3,5(10)}$-estratriene-17 - one, obtained by the process of Ruggieri et al., Gazz. vol. 93, 1963, page 269, were admixed with 150 cc. of ethanol and 1.45 gm. of hydroxylamine hydrochloride, and the mixture was held at reflux for 1 hour after which it was cooled to 20° C., neutralized with 2 cc. of triethylamine and concentrated to 50 cc. under vacuum and agitation. Then, 150 cc. of water were added to the concentrated mixture which was then cooled. The precipitate obtained was vacuum filtered, then washed with water until the wash waters were neutral and finally dried under vacuum to obtain 5.23 gm. of a raw product which was purified by recrystallization from ethyl acetate to obtain 2.31 gm. (44% yield) of $\Delta^{2'}$-(4',5'-16$\alpha$,17$\alpha$)-isoaxolino-3-methoxy-$\Delta^{1,3,5(10)}$-estratriene-17$\beta$-ol having a melting point of 241—242° C. and a specific rotation of $[\alpha]_D^{20}=+113°$ (c.=0.8% in dimethylformamide).

The product occurred in the form of crystalline needles which were slightly soluble in alcohol and insoluble in water.

*Analysis.*—$C_{20}H_{25}O_3N$ (molecular weight=327.41): Calculated (percent): C, 73.37; H, 7.70; N, 4.28. Found (percent): C, 73.3; H, 7.7; N, 4.4.

Step B: Preparation of $\Delta^{2'}$-(4',5'-16$\alpha$,17$\alpha$)-isoxazolino-3,17$\beta$-dimethoxy-$\Delta^{1,3,5(10)}$-estratriene.—10 gm. of $\Delta^{2'}$-(4',5' - 16$\alpha$,17$a$) - isoxazolino - 3 - methoxy - $\Delta^{1,3,5(10)}$-estratriene-17$\beta$-ol, obtained in the preceding step, were dissolved in 500 cc. of acetone and 200 cc. of dimethylformamide and 75 gm. of silver oxide and 50 cc. of methyliodide were added thereto. The mixture was agitated for 4 hours under an atmosphere of nitrogen and in the total absence of light and filtered. The precipitate obtained was washed with an acetone-dimethylformamide mixture (1:1), and 2,000 cc. of water were added hereto. Then, the precipitate was filtered and extracted with methylene chloride. The organic phase was washed first with water, then with an aqueous solution of sodium chloride, dried over sodium sulfate and finally evaporated to dryness to obtain 12.7 gm. of an amorphous product which was purified by recrystallization from ethyl acetate to obtain 3.07 gm. of $\Delta^{2'}$-(4',5'-16$\alpha$,17$\alpha$)-isoxazolino-3,17$\beta$-dimethoxy-$\Delta^{1,3,5(10)}$-estratriene, having a melting point of 164° C. and a specific rotation of $[\alpha]_D^{20}=+137.6°$ (c.=1% in dimethylformamide).

The product obtained occurred in the form of crystalline needles, soluble in alcohol and chloroform and insoluble in water.

*Analysis.*—$C_{21}H_{27}O_3N$ (molecular weight=341.44): (Calculated (percent): C, 73.86; H, 7.97; N, 4.11. Found (percent): C, 73.7; H, 7.9; N, 4.3.

Infra-red spectra:
  absence of hydroxyl
  absence of carbonyl

Ultra-violet spectra: in ethanol

| | |
|---|---|
| Inflection toward 219 m$\mu$ | $E_1^{1\%}$ cm.=273 |
| Inflection toward 229 m$\mu$ | $E_1^{1\%}$ cm.=204 |
| $\lambda_{max.}$ at 277–278 m$\mu$ | $E_1^{1\%}$ cm.=59 |
| $\lambda_{max.}$ at 286 m$\mu$ | $E_1^{1\%}$ cm.=56 |

Ultra-violet spectra: in ethanol—N/10 hydrochloric acid

| | |
|---|---|
| Inflection toward 220 m$\mu$ | $E_1^{1\%}$ cm.=265 |
| Inflection toward 229 m$\mu$ | $E_1^{1\%}$ cm.=199 |
| $\lambda_{max}$ at 278 m$\mu$ | $E_1^{1\%}$ cm.=58 |
| $\lambda_{max.}$ at 286 m$\mu$ | $E_1^{1\%}$ cm.=52 |

This product is not described in the literature.

EXAMPLE III

Preparation of $\Delta^{2'}$-(4',5'-16$\alpha$,17$\alpha$)-isoxazolino-3-methoxy-17$\beta$-acetoxy-$\Delta^{1,3,5(10)}$-estratriene.

1 gm. of $\Delta^{2'}$-(4',5'-16$\alpha$,17$\alpha$)-isoxazolino-3-methoxy-$\Delta^{1,3,5(10)}$-estratriene-17$\beta$-ol, obtained as described in Step A of Example II, was dissolved in 10 cc. of pyridine and 5 cc. of acetic anhydride and the solution was allowed to stand for 72 hours under an atmosphere of nitrogen with agitation at room temperature. Then, the solution was poured in a mixture of 5 cc. of pyridine and 100 cc. of a water-ice mixture and agitated for 2 hours. The precipitate was vacuum filtered and washed with water until the wash waters were neutral. Then the pricipitate was dissolved in 10 cc. of hot methanol and the solution was treated with charcoal and filtered. The solution was then concentrated to 8 cc., iced and filtered to obtain 650 mg. of raw product which was purified by recrystallization from methanol to obtain 400 mg. of $\Delta^{2'}$-(4'5'-16$\alpha$,17$\alpha$) - isoxazolino - 3 - methoxy - 17$\beta$ - acetoxy-$\Delta^{1,3,5(10)}$-estratriene, having a melting point of 135–136° C. and a specific rotation of $[\alpha]_D=+170.8°$ (c.=0.5% in chloroform) and +182.6° (c.=0.5% in dimethylformamide).

The product occurred in the form of crystalline needles soluble in chloroform and insoluble in water and alcohol.

*Analysis.*—$C_{22}H_{27}O_4N$ (molecular weight=369.45): Calculated (percent): C, 71.50; H, 7.37. Found (percent): C, 71.3; H, 7.4.

Infra-red spectra: carfbonyl at 1750 cm.$^{-1}$

This product is not described in the literature.

EXAMPLE IV

Preparation of $\Delta^{2'}$-(4',5'-16$\alpha$,17$\alpha$)-isoxazolino-13$\beta$-ethyl-$\Delta^{1,3,5(10)}$-gonatriene-3,17$\beta$-diol Step A: 3-acetoxy-13$\beta$-ethyl-$\Delta^{1,3,5(10)}$-gonatriene-17$\beta$-ol.—13 gm. of 13$\beta$-ethyl-$\Delta^{1,3,5(10)}$-gonatriene-3,17$\beta$-diol, described in Belgian Pat. No. 657,260, were introduced into 130 cc. of acetone and after 100 cc. of 0.5 N sodium hydroxide were added thereto, the mixture was agitated for 5 minutes at 20° C. under an inert atmosphere. The reaction mixture was brought to a temperature of about +10° C. and then 4.65 cc. of acetic acid anhydride were slowly introduced. The resulting reaction mixture was cooled to 0° C. and maintained at this temperature for 1 hour under agitation. The precipitate formed was recovered by vacuum filtration, washed with water and again thoroughly vacuum filtered. Then 65 cc. of acetone were added and the reaction mixture was cooled to a temperature of about 0° C. A mixture of 130 cc. of water and 26 cc. of 0.5 N sodium hydroxide was added thereto and the reaction mixture was agitated for 5 minutes. 1.5 cc. of acetic acid anhydride were added and the reaction mixture was agitated for 15 minutes. Thereafter, 26 cc. of 0.5 N sodium hydroxide were introduced into the reaction mixture, which was then agitated for 5 minutes. Next, 1.1 cc. of acetic acid anhydride was added thereto and the reaction mixture was agitated for 30 minutes longer at about 0° C. The precipitate formed was vacuum filtered, washed first with water until the wash water was neutral, and dried to obtain 13.74 gm. of 3 - acetoxy - 13$\beta$ - ethyl-$\Delta^{1,3,5()}$-gonatriene-17$\beta$-ol, having a melting point of 153° C. and it was utilized as such for the next step of the synthesis.

Step B: 3 - acetoxy - 13$\beta$ - ethyl-$\Delta^{1,3,5(10)}$-gonatriene-one.—13 gm. of 3-acetoxy-13$\beta$-ethyl-$\Delta^{1,3,5(10)}$-gonatriene-17$\beta$-ol, prepared as in Step A, were introduced into 340 cc. of acetone containing 5% water and then, over a period of about 15 minutes, a solution containing 4.05 gm. of chromium trioxide and 3.45 cc. of concentrated sulfuric acid in sufficient water to obtain a solution with a volume of 15 cc., was added. The mixture was agitated for 15 minutes at a temperature of 0° C. and after the addition of a mixture of 13 cc. of an aqueous solution of sodium bisulfite (density=1.28) and 39 cc. of water, the reaction mixture was poured into 800 gm. of ice and 1700 cc. of water. The precipitate formed was vacuum filtered, washed with water and again vacuum filtered to obtain 13 gm. of raw 3-acetoxy-13$\beta$-ethyl-$\Delta^{1,3,5(10)}$- gonatriene-17-one which was utilized as such for the next step.

Step C: 13β - ethyl-$\Delta^{1,3,5(10)}$-gonatriene-3-ol-17-one.—13 gm. of 3-acetoxy-13β-ethyl-$\Delta^{1,3,5(10)}$-gonatriene-17-one, prepared in Step B, were introduced into 130 cc. of methanol and 5.2 cc. of a 36° Bé. sodium hydroxide solution were added thereto. The mixture was agitated for 1 hour at room temperature under an inert atmosphere after which a mixture of concentrated hydrochloric acid and water (50:50) was added in sufficient amount to obtain a pH value of 3–4. The reaction mixture was then poured into 700 cc. of water and 300 gm. of ice, allowed to remain in contact therewith for 30 minutes after which the precipitate was vacuum filtered, washed with water and dried to obtain 11.05 gm. of raw product which was recrystallized from acetone to obtain 8.30 gm. of 13β-ethyl-$\Delta^{1,3,5(10)}$-gonatriene-3-ol-17-one having a melting point of 255° C. and a specific rotation of $[\alpha]_D$ = +116°±1.5° (c.=1% in dioxane).

*Analysis.*—$C_{19}H_{24}O_2$ (molecular weight=284.39); Calculated (percent): C, 80.24; H, 8.5. Found (percent): C, 80.5; H, 8.6.

Step D: 13β-ethyl - 16 - hydroxymethylene-$\Delta^{1,3,5(10)}$-gonatriene-3-ol-17-one.—1.48 gm. of 13β-ethyl-$\Delta^{1,3,5(10)}$-gonatriene-3-ol-17-one were introduced into 120 cc. of anhydrous benzene after which 13.5 cc. of ethyl formate, 6 gm. of 50% sodium hydride in oil, 30 cc. of benzene and 0.2 cc. of anhydrous methanol were added. The suspension thus formed was agitated overnight at room temperature under an atmosphere of nitrogen after which it was heated at reflux for two and a half hours. After the reaction mixture was cooled, a water-ice mixture was added thereto and the aqueous phase, containing the sodium salt of the formylated derivative, was decanated, washed first with ethyl ether and then with petroleum ether. Next, the aqueous phases were combined, acidified with 4 N hydrochloric acid and agitated for 1 hour. The resulting product was vacuum filtered, washed with water and dried to obtain 1.38 gm. of 13β-ethyl-16-hydroxymethylene-$\Delta^{1,3,5(10)}$-gonatriene-3-ol-17-one having a melting point of 100–110° C. The white product was soluble in dilute aqueous alkalis and in chloroform and insoluble in water.

This compound is not described in the literature.

Step E: Preparation of $\Delta^{2'}$-(4',5'-16α,17α)-isoxazolino-13β-ethyl-$\Delta^{1,3,5(10)}$-gonatriene-3,17β-diol.—1.28 gm. of sodium acetate and 0.4 gm. of hydroxylamine hydrochloride were introduced into 10 cc. of ethanol and the suspension was agitated for several minutes at a temperature of 40° C. after which 1.276 gm. of 13β-ethyl-16-hydroxymethylene-$\Delta^{1,3,5(10)}$-gonatriene-3-ol-17-one in 10 cc. of ethanol were added. The reaction mixture was heated at reflux for 1 hour and then was concentrated under vacuum and water was added thereto. The reaction mixture was agitated and the precipitate formed was vacuum filtered, washed with water, dried and purified by subjecting the product to chromatography through silica gel, the eluting solvent being a benzene-ethanol-dioxane mixture (36:4:5). The product thus purified was then dissolved in hot ethyl acetate, and the solution was filtered and concentrated to a small volume to obtain a first yield of 270 mg. of $\Delta^{2'}$(4',5'-16α,17a)-isoxazolino-13β-ethyl-$\Delta^{1,3,5(10)}$-gonatriene-3,17β-diol, having a melting point of 208–210° C. and a specific rotation of $[\alpha]_D^{20}$=+96°±3° (c.=0.5% in dimethylformamide).

*Analysis.*—$C_{20}H_{25}O_3N$ (molecular weight=327.41): Calculated (percent): C, 73.37; H, 7.70; N, 4.28. Found (percent): C, 73.3; H, 7.8; N, 4.4.

By evaporating the mother liquors to dryness, a second yield of the product was obtained which after recrystallization from methanol also had a melting point of 208–210° C. 225 mg. of product were recovered in this way.

The novel compound occurred in the form of white crystals soluble in dilute aqueous alkalis, slightly soluble in alcohol and chloroform and insoluble in water.

The compound is not described in the literature.

PHARMACOLOGICAL DATA (A) Hypocholesterolemic action on the female rat

The test was carried out on groups of female rats having an average weight of 200 gm. each. $\Delta^{2'}$-(4',5'-16α,17α)-isoxazolino-2-fluoro - $\Delta^{1,3,5(10)}$ - estratriene - 3,17β-diol was utilized in aqueous suspension and was administered orally at daily doses of 50, 100 and 200 γ/kg. for a period of 10 days to the said animals. A group of female rats of the same age and weight served as control. Samples of blood were taken on the eleventh day with a view to determine the amount of seric sterols and the animals were sacrified on the same day. The uterus, liver and suprarenal glands were separated and weighed. The results are summarized in Table I.

TABLE I

| Groups | Doses, γ/kg. | Seric sterols, g. ‰ | Hepatic sterols, g. ‰ | Uterus, mg. | Suprarenal glands, mg. | Liver, percent g. | Gain in body weight, percent |
|---|---|---|---|---|---|---|---|
| Control rats | 0 | 0.62 | 2.39 | 353 | 57.2 | 4.04 | +11 |
| Treated rats | 50 | 0.67 (+8%) | | 395 (+12%) | 56.7 | 4.02 | +14 |
| | 100 | 0.42 (−32%) | | 408 (+15%) | 63.1 | 3.84 | +8 |
| | 200 | 0.44 (−29%) | 2.39 | 365 (+3%) | 58.0 | 3.90 | +7 |

In another test using the same procedure, the compounds in Table II were administered to said female rats at the dosages recited therein. The percent reduction in the amount of seric sterols was determined and the results are set forth in Table II.

TABLE II

| | Reduction in amounts of seric sterols in percent | | | |
|---|---|---|---|---|
| Test compounds | 50 γ/kg. per day | 100 γ/kg. per day | 200 γ/kg. per day | 500 γ/kg. per day |
| $\Delta^{2'}$-(4',5'-16α,17α)- isoxazolino-2-fluoro-$\Delta^{1,3,5(10)}$-estratriene-3,17β-diol | | −38 | −25 | −58 |
| $\Delta^{2'}$-(4',5'-16α,17α)-isoxazolino-3-methoxy-$\Delta^{1,3,5(10)}$-estratriene-17β-01 | −66 | −57 | −62 | −58 |
| $\Delta^{2'}$-(4',5'-16α,17α)-isoxazolino-methoxy-β$^{1,3,5(10)}$-estratriene | | −63 | | −74 |
| $\Delta^{2'}$-4',5'-16α,17α-isoxazolino-3,17β-dimethoxy-$\Delta^{1,3,5(10)}$-estratriene | −44 | −66 | | −64 |

Tables I and II demonstrate that the products of the invention possess a significant and certain hypocholesterolemic activity beginning with a daily dose of 50γ/kg.

(B) Investigation of estrogenic activity—Allen Doisy test

The test compounds were utilized in suspension in an aqueous dispersant and were administered orally to groups of castarted female rats at varying dosages. Vaginal smears were taken each day starting from the second day of treatment for a period of seven days. Only those smears formed exclusively of keratinized cells were retained as positive. The rat unit for $\Delta^{2'}$-(4',5'-16α,17α)-isoxazolino-2-fluoro-$\Delta^{1,3,5(10)}$-estratriene-3,17β-diol was 10 mg.; for $\Delta^{2'}$-(4',5'-16α,17α)-isoxazolino-3-methoxy-$\Delta^{1,3,5(10)}$-estratriene-17β-ol was 1 mg.; for $\Delta^{2'}$-(4',5'-16α,17α)-isoxazolino-3-methoxy-17-β-acetoxy-$\Delta^{1,3,5(10)}$-estratriene was about 2 mg.; and for $\Delta^{2'}$-(4',5'-16α,17α)-isoxazolino-3,17β-dimethoxy-$\Delta^{1,3,5(10)}$-estratriene was 1 mg.

The said results show that the compounds of the invention are only slightly estrogenic, particularly the 2-fluoro derivative wherein the rat unit is reached only at a dosage of 10 mg. per rat.

Various modifications of the compounds and process of the invention may be made without departing from the spirit or scope thereof, and it is to be understood that the invention is to be limited only as defined in the appended claims.

We claim:
1. A 16α,17α-isoxazoline steroid of the formula

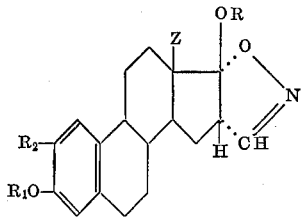

wherein R and $R_1$ are selected from the group consisting of hydrogen, alkyl of 1 to 7 carbon atoms and acyl of an organic carboxylic acids of 1 to 18 carbon atoms, $R_2$ is selected from the group consisting of hydrogen and halogen and Z is alkyl of 1 to 4 carbon atoms.

2. A compound of claim 1 wherein Z is methyl and $R_1$ is selected from the group consisting of hydrogen and alkyl of 1 to 7 carbon atoms.
3. A compound of claim 1 which is $\Delta^{2'}$-(4',5'-16α,17α)-isoxazolino-2-fluoro-$\Delta^{1,3,5(10)}$-estratriene-3,17β-diol.
4. A compound of claim 1 which is $\Delta^{2'}$-(4',5'-16α,17α)-isoxazolino-3,17β-dimethoxy-$\Delta^{1,3,5(10)}$-estratriene.
5. A compound of claim 1 which is $\Delta^{2'}$-(4',5',-16α,17α)-isoxazolino-3-methoxy-17β-acetoxy-$\Delta^{1,3,5(10)}$-estratriene.
6. A compound of claim 1 which is $\Delta^{2'}$-(4',5'-16α,17α)-isoxazolino-13β-ethyl-$\Delta^{1,3,5(10)}$-gonatriene-3, 17β-diol.
7. A process for the preparation of a compound of claim 1 which comprises reacting in an acid media a 16-hydroxymethylene - 13β-Z-$\Delta^{1,3,5(10)}$-gonatriene-17-one of the formula

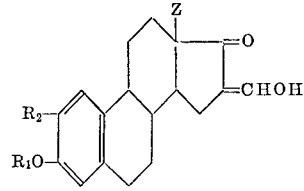

wherein $R_1$, $R_2$ and Z have the definitions of claim 1 with a compound selected from the group consisting of hydroxylamine and its acid addition salts to form the corresponding 16α,17α-isoxazoline steroid of claim 1.

References Cited
UNITED STATES PATENTS 3,213,084  10/1965  Schaub et al. _____ 260—239.5

HENRY A. FRENCH, Primary Examiner

U.S. Cl. X.R.

260—397.4; 424—241